Feb. 17, 1970 H. STACKEGARD 3,496,282
UNIPOLAR POWER TRANSMISSION LINE IN DUPLEX ARRANGEMENT
Filed Sept. 9, 1968 2 Sheets-Sheet 1

INVENTOR.
HANS STACKEGARD
BY
Jennings Bailey, Jr

INVENTOR.
HANS STACKEGARD

United States Patent Office 3,496,282
Patented Feb. 17, 1970

3,496,282
UNIPOLAR POWER TRANSMISSION LINE IN DUPLEX ARRANGEMENT
Hans Stackegard, Ludvika, Sweden, assignor to Allmänna Svenska Elektriska Aktiebolaget, Vasteras, Sweden, a corporation of Sweden
Filed Sept. 9, 1968, Ser. No. 758,303
Claims priority, application Sweden, Sept. 19, 1967, 12,899/67
Int. Cl. H02g 7/20
U.S. Cl. 174—43      3 Claims

ABSTRACT OF THE DISCLOSURE

A unipolar power transmission line with parallel conductors supported on the cross-pieces of towers of the "scales" type. The conductors are drawn together between each pair of towers to reduce the corona losses.

BACKGROUND OF THE INVENTION

Field of the invention

The present invention relates to a unipolar power transmission line comprising two or more conductors of the same polarity.

The prior art

In a high voltage power transmission line having two conductors, the simplest tower is of the so-called "scales type," this is a one-legged tower having a cross member at the top with an insulator chain at each end to suspend the two conductors. Such lines can be used for high voltage direct current, in which case one conductor is positive and the other is negative. In order to decrease the corona losses the conductors are suitably designed as duplex or triplex conductors, that is as two or three parallel conductors mutually joined by a spacer. The arrangement has the disadvantage that if tower falls over the entire transmission line will be broken.

If, however, the positive and negative conductors are separately arranged on individual towers collapse of one tower would only cause a breakdown in one of the conductors. The power transmission can then be maintained on a reduced scale with the help of the other conductor and an earthed conductor. It towers of the "scales type" are still used, two parallel conductors having the same polarity can be suspended on either side of the two towers. The number of conductors will then be the same as with the above-mentioned duplex arrangement with one row of towers. However, a reduction of corona losses is not obtained since the parallel conductors are at a considerable distance from each other.

SUMMARY OF THE INVENTION

In order to reduce the corona losses its is now suggested that the parallel conductors be drawn together between the towers so that a duplex arrangement is formed on the parts of the conductors lying between the towers. At the same time a more stable suspension of the conductors is obtained so that the curve in these will be less. Special means to limit said curve are therefore unnecessary.

BRIEF DESCRIPTION OF THE DRAWINGS

The invention will be further described with reference to the accompanying drawings where.

DESCRIPTION OF THE PREFERRED EMBODIMENTS

Figure 1:
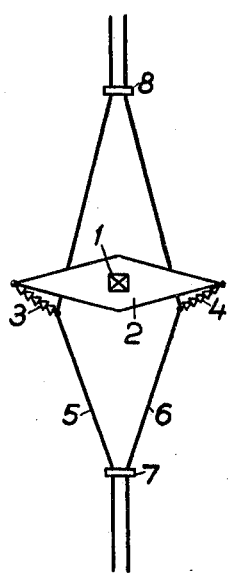
FIGURES 1 and 2 show a tower with its conductors according to the invention seen from above and from the sides and FIGURES 3-7 show a modification of the invention.
Figure 2:
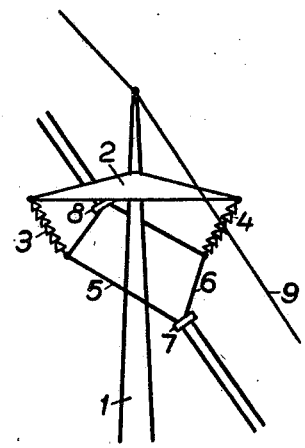

FIGURES 1 and 2 show a tower 1 provided with a cross piece 2 at the ends of which are suspended insulator chains 3 and 4 carrying conductors 5 and 6 which have the same polarity. At a suitable distance from the tower 1 the conductors 5 and 6 have been drawn together with the help of fittings 7 and 8 so that a duplex arrangement is obtained at the free parts of the conductors between the tower shown and the adjacent tower. In this way the corona losses between the towers will be the same as for normal duplex conductors. A certain limitation of the corona losses can be achieved even between the fittings 7 and 8, particularly in the vicinity of these fittings.

The distance between the fittings 7 and 8 is adjusted in relation to the distance between the insulator chains 3 and 4 and their length so that bending of the conductors at the suspension points and the declination of the insulator chains is kept within reasonable limits. It is seen that the line parts between the fittings 7 and 8, together with the insulator chains 3 and 4 form a well-defined geometric construction and by suitable choice of the various lengths in this construction a system can be achieved which can take up vibrations while at the same time keeping the curves within reasonable limits. Thus the need for special means for fixed line transmission, such as for example V-chains of insulators, is avoided.

FIGURE 2 shows an overhead earth line 9 at the top of the tower 1. One of the objects of such an earth line is to act as lightning arrester for the main conductors 5 and 6. In order to achieve this it is known that the ratio between the height of the earth line above the conductors and the mutual distance between these may not be less than a certain value corresponding to a certain maximum apex angle in the triangle formed by the three conductors.

Since the conductors 5 and 6 are drawn together between the towers the distance between them at the suspension points will also be reduced which means that the earth line 9 can be placed lower. The invention thus enables the total height of the tower to be reduced.

Figure 4:
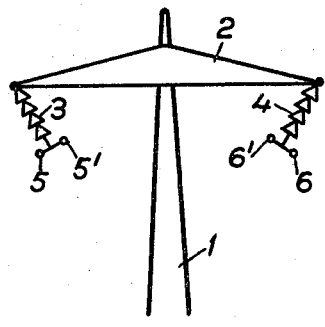
Figure 5:
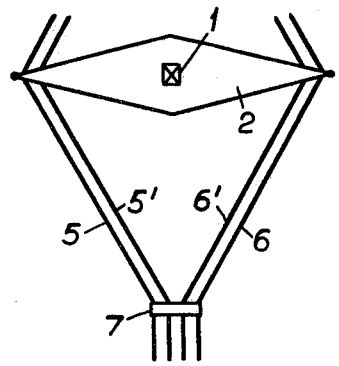
Figure 6:
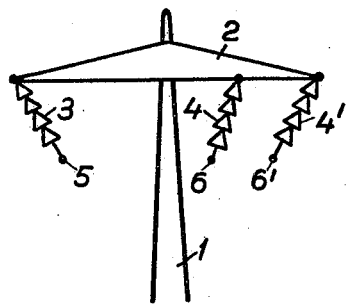
Figure 7:
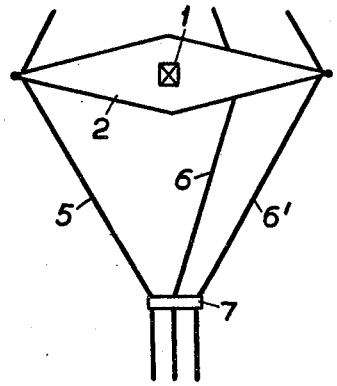

Only two parallel conductors 5 and 6 have been shown in the drawings. It is, however, obvious that one or both conductors can be made as duplex conductors thus forming a conductor system of triplex or greater magnitude between the towers as shown in FIGURES 4 and 5. Here we have two duplex lines 5, 5' and 6, 6' suspended each at their own end of the traverse 2. At a certain distance from the tower the two duplex-lines are drawn together by a fitting 7 to form a quadruplex line. Similarly three or more conductors may be suspended individually on the traverse 2 and drawn together at a suitable distance from the traverse as shown in FIGURES 6 and 7.

In these figures are shown three conductors 5, 6, 6' suspended in insulators 3, 4, 4' respectively and drawn together by a fitting 7 to form a triplex-line.

Figure 3:
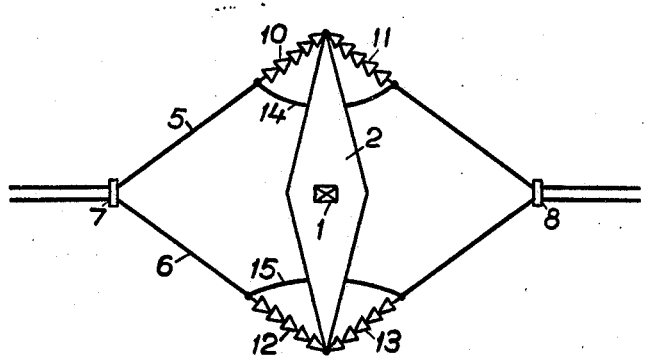

FIGURE 3 shows a modification of the invention where the conductors 5 and 6 are suspended by so-called stretch chains 10–13 of insulators bridged by hanging connections 14 and 15. The number of insulator chains is thus doubled but on the other hand the distance between the fittings 7 and 8, and thus the corona losses, can be reduced. The height of the towers can also be considerably reduced.

I claim:

1. Unipolar power transmission line comprising towers with cross-pieces of the "scale type" and two parallel conductors having the same polarity suspended one at each end of each cross-piece, in which at a certain distance from the towers the parallel conductors are drawn together by means of fittings so as to be substantially closer together than the ends of the cross-piece and so that the conductors between the towers form duplex-conductors at a constant distance apart.

2. Unipolar power transmission line according to claim 1, in which at least one of the conductors is a duplex-conductor so that a conductor system of at least triplex magnitude is formed between the towers.

3. Unipolar power transmission line according to claim 1, comprising more than two parallel conductors suspended in the tower traverses, in which all the conductors are drawn together at a certain distance from the towers to form a conductor system of at least triplex magnitude.

References Cited
UNITED STATES PATENTS 3,291,892  12/1966  Bethea _____ 174—146 X

FOREIGN PATENTS 172,477  9/1952  Austria.
434,004  11/1911  France.
1,091,799  11/1954  France.
720,547  5/1942  Germany.

LARAMIE E. ASKIN, Primary Examiner

U.S. Cl. X.R.

174—45